Figure 4:
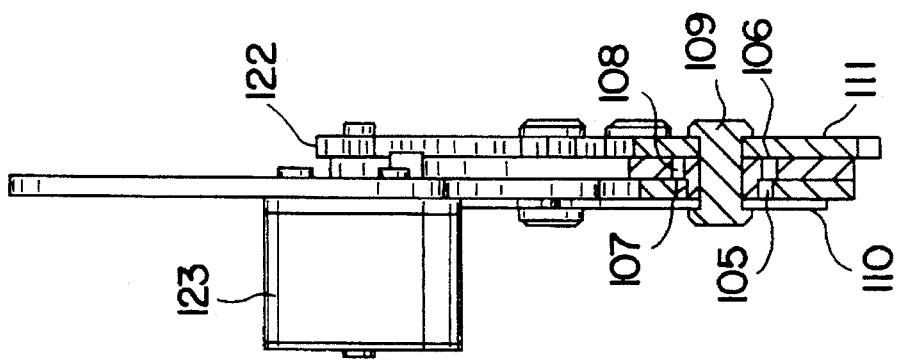

United States Patent [19]

Lindblad

[11] Patent Number: 5,462,498
[45] Date of Patent: Oct. 31, 1995

[54] DEVICE FOR RELATIVE ANGULAR SETTING OF TWO UNITS, PREFERABLY THE INCLINATION OF A VEHICLE-SEAT BACK REST

[75] Inventor: Lennart Lindblad, Vårgårda, Sweden

[73] Assignee: Linvent AB, Vargarda, Sweden

[21] Appl. No.: 142,348

[22] PCT Filed: May 20, 1992

[86] PCT No.: PCT/SE92/00334

§ 371 Date: Dec. 20, 1993

§ 102(e) Date: Dec. 20, 1993

[87] PCT Pub. No.: WO92/20548

PCT Pub. Date: Nov. 26, 1992

[30] Foreign Application Priority Data

May 21, 1991 [SE] Sweden .................................. 9101515

[51] Int. Cl.⁶ ...................................................... B60N 2/22
[52] U.S. Cl. ........................... 475/342; 475/347; 297/362
[58] Field of Search ............................. 297/362; 475/341, 475/342

[56] References Cited

U.S. PATENT DOCUMENTS

| | | | |
|---|---|---|---|
| 3,792,629 | 2/1974 | Applebury | 475/342 |
| 4,211,451 | 7/1980 | Shephard | 297/362 |
| 4,345,792 | 8/1982 | Shephard | 297/362 |
| 4,882,943 | 11/1989 | Pipon et al. | 475/342 |
| 5,098,359 | 3/1992 | Chales et al. | 475/347 |
| 5,127,286 | 7/1992 | Wittig | 74/553 |

FOREIGN PATENT DOCUMENTS

| | | |
|---|---|---|
| 0332340 | 9/1989 | European Pat. Off. . |
| 2539023 | 12/1979 | Germany . |
| 3729134 | 3/1989 | Germany . |
| 4023934 | 2/1991 | Germany . |
| 380480 | 11/1975 | Sweden . |
| 412192 | 2/1980 | Sweden . |
| 2248481 | 4/1992 | United Kingdom . |
| 2257035 | 1/1993 | United Kingdom . |

*Primary Examiner*—Dirk Wright
*Attorney, Agent, or Firm*—Dvorak and Traub

[57] ABSTRACT

The invention concerns a device, preferably arranged for setting inclination of a backrest of a seat, primarily a vehicle seat, comprising components which are interconnected in pairs for mutual rotational movement and which are arranged to be associated with the back rest and the seat face, respectively, of the seat. Each component of the pair is formed with a gear rim, the rims positioned adjacent one another in mutual concentric relationship, with the rim teeth meshing with the teeth of a number of planet wheel pairs, the latter rolling in mesh with the associated gear rim, thus causing the two gear rims and their associated component of the joint to turn relatively to one another, and consequently the back rest of the seat to pivot with respect to the seat part.

7 Claims, 4 Drawing Sheets

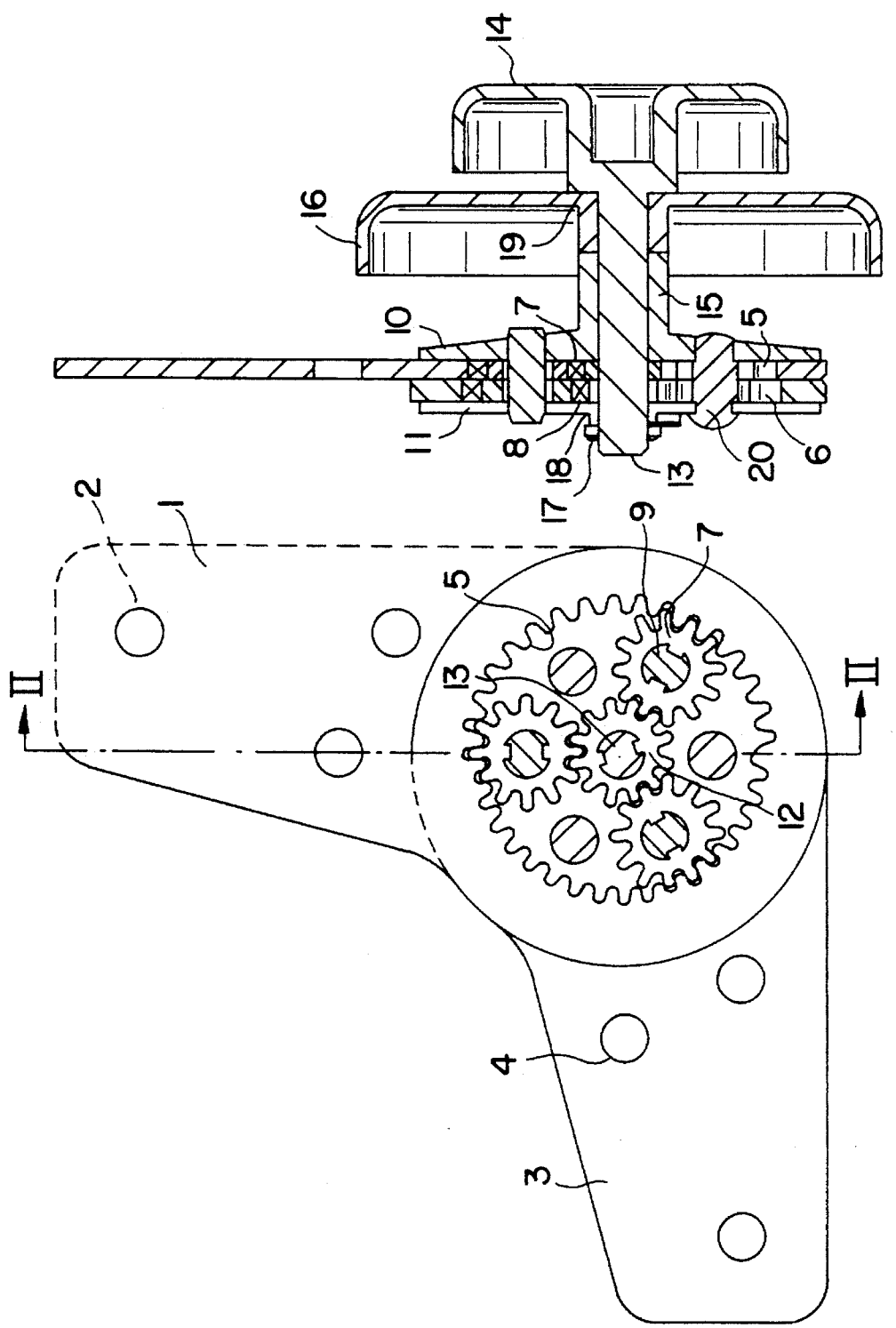

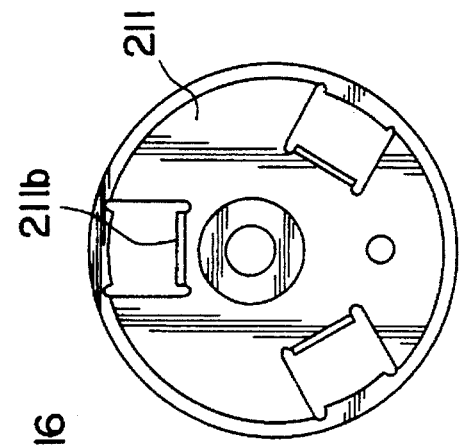
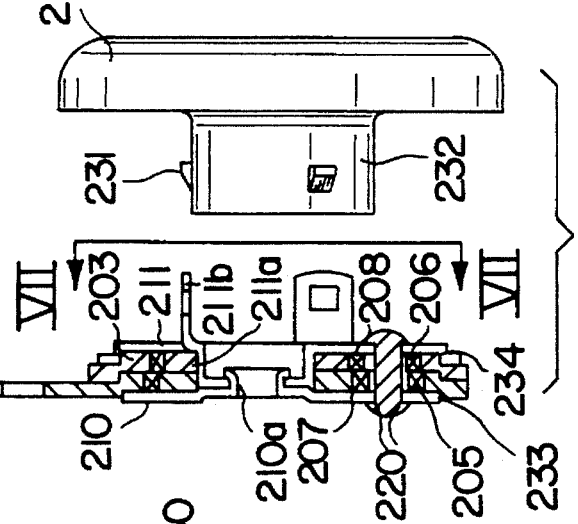
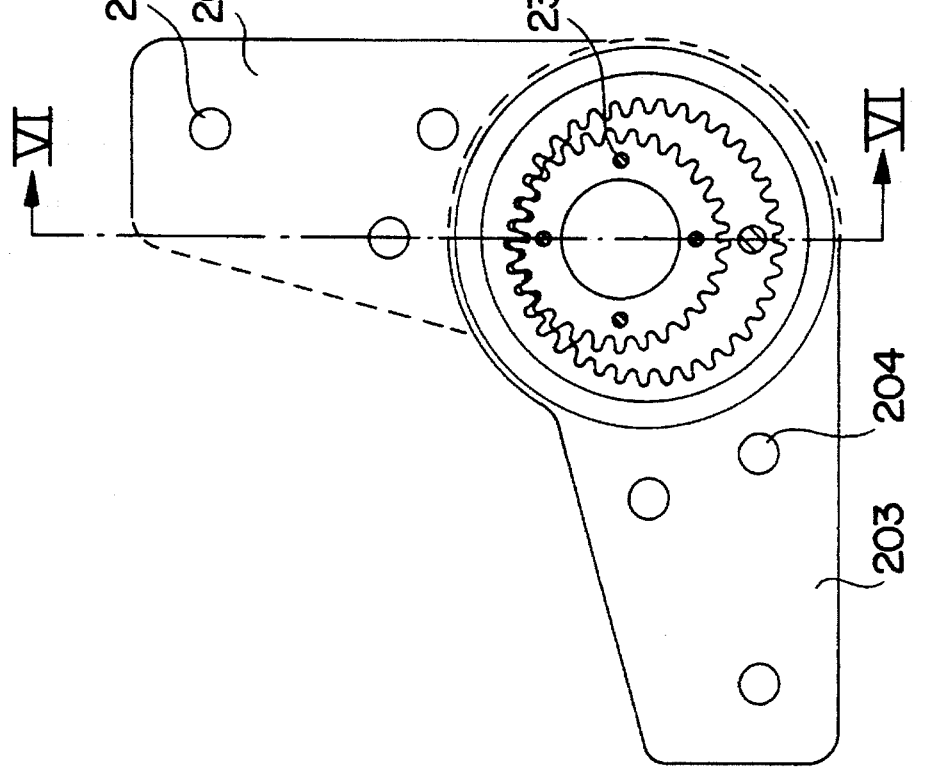
FIG. 7
FIG. 6
FIG. 5

DEVICE FOR RELATIVE ANGULAR SETTING OF TWO UNITS, PREFERABLY THE INCLINATION OF A VEHICLE-SEAT BACK REST

The subject invention concerns a device for relative angular setting of two units, preferably the inclination of the back rest of a seat, and particularly a vehicle seat, comprising components that are interconnected in pairs for mutual rotational movement, said components preferably being separate fitting components which are arranged to be be associated with the back rest and the seat face, respectively, of the vehicle seat.

The main purpose of the invention is to provide a constructionally simple and reliable adjustment device for continuous, i.e. stepless, setting of the inclination of the back rest.

This purpose is achieved by means of a device in accordance with the invention which is essentially characterized in that each component of said pair of integrated seat components is formed with a gear rim, each with a different number of teeth, said rims being positioned adjacent one another in mutual concentric relationship, with the rim teeth meshing wtih a number of planet wheel pairs, wherein each pair comprises two planet wheels, said wheels likewise being positioned adjacent one another in mutual concentric relationship and being non-rotationally interconnected, whereby the rolling of the planet wheel/wheels in mesh with the associated gear rim causes the two gear rims and the associated components of the joint to turn with respect to one another and consequently the back rest of the vehicle seat to pivot with respect to the seat face.

In accordance with a preferred embodiment, the device comprises at least two pairs of planet wheels which are supported by a common support member, and an actuator arranged to move the planet wheels along their respective gear rim.

Preferably, the actuator is a hand wheel which is non-rotationally connected to the planet-wheel support member.

In accordance with a suitable development the planet wheels also mesh with a central sun wheel which is drivingly connected with an actuator, the latter preferably being a hand wheel.

Preferably, the actuators associated with the planet wheel support members and with the sun wheel, respectively, may be made as two coaxial hand wheels, the one connected with the sun wheel preferably being of smaller-diameter size with respect to and located externally of, the hand wheel connected with the planet wheel support member. In this manner, the two hand wheel could be manipulated in a convenient manner optionally by one hand, depending on whether rough or fine adjustment of the back rest position is desired.

The actuator could also be an electric motor and in accordance with one alternative embodiment, the motor could mesh with a gear rim which is non-rotationally connected with the planet wheel support member. It should be understood that in accordance with the embodiments mentioned previously and including sun wheels, the latter could with advantage be driven by an electric motor.

Preferably, all planet wheels have the same number of teeth and the toothed wheels of the same pair have a different cog tooth module whereas the cog tooth module of the two gear rims corresponds to the module of the planet wheel meshingly cooperating therewith while on the other hand they have a mutually different number of teeth.

Preferably, the two components of the joint as well as the planetary wheel support member are configured as disk-shaped members in abutting relationship, with the planet wheel support member forming a cap covering the individual gear tracks. In this manner it becomes possible to provide a construction that is very thin and which in addition is well protected from external impurities that may cause mal-functioning of the device.

Figure 3:
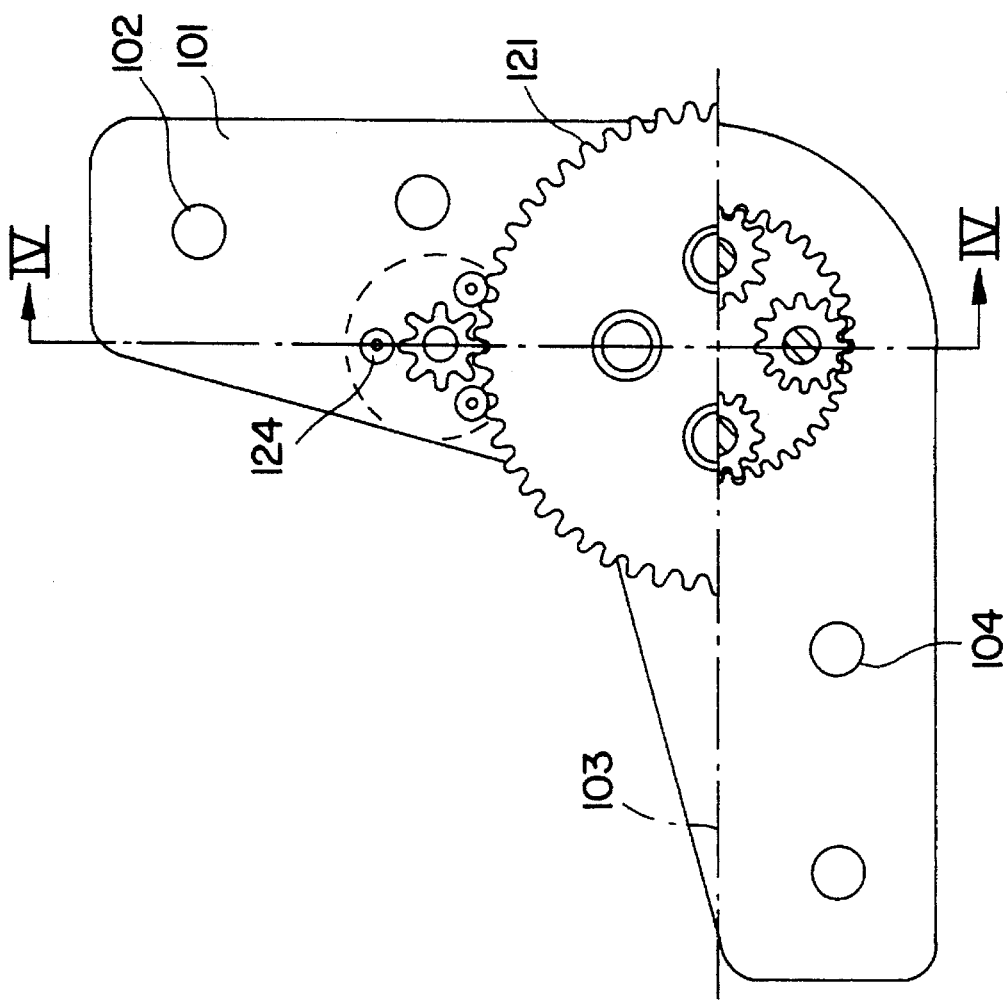
Figure 8:
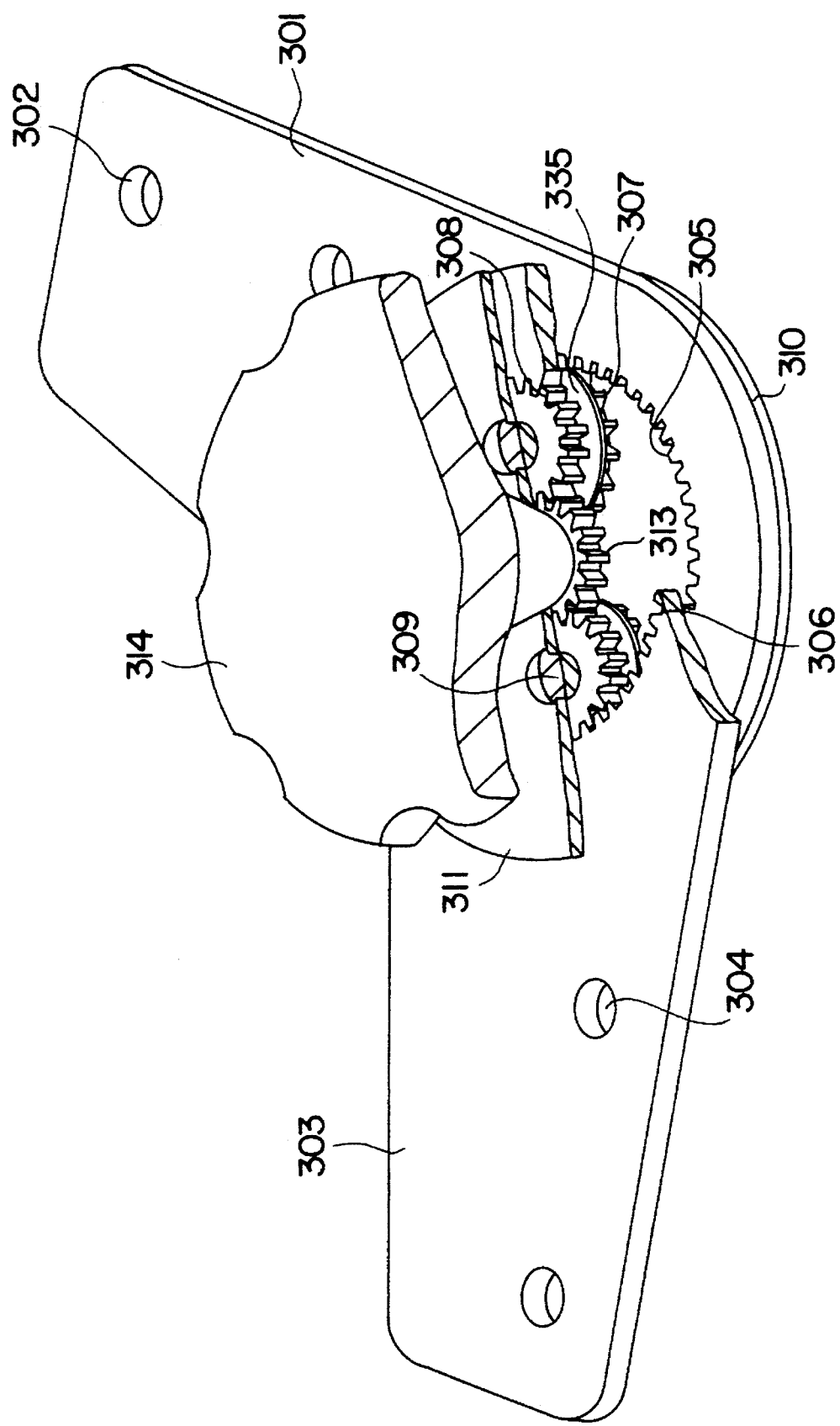

Some embodiments of the invention will be described in the following in closer detail with reference to the accompanying drawings, wherein FIG. 1 is a sectional view through a fitting of a joint in accordance with the invention, and FIG. 2 is a sectional view along line II—II of FIG. 1 through the same fitting, FIG. 3 is a sectional view with the section taken at different levels, through a fitting of a joint in accordance with an alternative embodiment, FIG. 4 is a sectional view along line IV—IV of FIG. 3 of the same fitting, FIG. 5 is a sectional view corresponding to FIG. 1, showing a fitting of a joint in accordance with a third alternative embodiment, FIG. 6 is a sectional view along line VI—VI of FIG. 5, FIG. 7 is a view along line VII—VII of FIG. 6 of the latter fitting, and FIG. 8 is a partly cut perspective view through a fitting of a joint in accordance with yet another alternative embodiment.

The fitting of the joint illustrated in FIGS. 1 and 2 comprises two fitting components which are interconnected for mutual rotational movement, one 1 of the components being provided with attachment holes 2 by means of which the component may be secured to the back rest of the seat, the latter preferably being a vehicle seat, while the other fitting component 3 is provided with attachment holes 4 for securement of that component to the seat part proper of the seat. Alternatively, the each component may be made integral with or be securely attached to its respective seat part in some other way, such as by welding. For reasons of clarity, the vehicle seat proper is not shown in any one of the drawing figures. The two fitting components 1 and 3 consist of plates placed in closely abutting relationship and each plate is formed with an internal gear rim 5 and 6, respectively, each with a different number of teeth. Reference numerals 7 and 8 indicate toothed wheels which are non-rotationally interconnected in pairs by a common shaft 9. In accordance with the embodiment illustrated there are three pairs of toothed wheels of this kind, said pairs of wheels being evenly distributed around the gear rims 5, 6, although obviously this number could vary, provided the teeth are chosen accordingly. The planet wheel units 7, 8 thus formed are supported by disk-shaped support members 10, 11 positioned on either side of the pair of fittings 1, 3, through which members the shafts 9 of the planet wheel units pass. In accordance with the embodiment illustrated, the support members 10, 11 likewise form the rotational bearing members in which the planet wheel shafts 9 are supported. Reference numeral 12 designates a sun wheel 12 which cooperates with one of the planet wheels, in accordance with the drawing planet wheel 7, of the planet wheel units, and which sun wheel is supported by a central shaft 13 on one of the ends of wich a hand wheel 14 is mounted. From the centre of the planet wheel support member 10 projects a sleeve 15 in which the shaft 13 is supported, said sleeve also carrying a hand wheel 16 the diameter of which preferably exceeds that of the hand wheel 14. The two hand wheels 14 and 16 preferably are positioned adjacent one another, allowing them to be conveniently manipulated by one hand.

Numeral reference 17 designates a shaft locking means, preferably in the shape of a clamp ring which via an intermediate washer 18 forms an axial abutment face with respect to the planet wheel support member 11. The inner face of the outer hand wheel 14 forms an axial abutment face 19 with respect to the outer face of the inner hand wheel 16. The support of the planet wheels in their respective support member 10, 11 may be arranged in any manner conventional in the art and therefore need not be described in detail in this connection. Reference numeral 20 designates rivets extending between the planet wheel units in such a manner as to bridge the inter-unit spacing and thus interconnecting the two planet wheel support members 10, 11. In this way, the latter are maintained a suitable distance apart with the result that no means for axial locking need to be provided on the external face of the planet wheel support members to secure the planet wheel shafts 9 in position. Because the planet wheel support members 10, 11 are configured as plates covering all gear tracks, the latter are well protected from dust entering from the outside, and consequently the gear mechanism will function well for along time. Generous amounts of a lubricant may be introduced into the interior space delimited externally by the plates 10, 11 and the gear rims 5, 6 of the fitting components 1, 3.

The fitting illustrated in FIGS. 1 and 2 functions in the following manner: When the hand wheel 16 is turned, it forces the planet wheels 7, 8 to turn along its respective gear tracks 5, 6 on the fitting components 1, 3. Because the two rims 5 and 6 have different numbers of cog teeth, the movement of the planet wheel pairs 7, 8 causes the two fitting components 1 and 3 to perform a relative movement, resulting in a change of the back rest inclination with respect to the seat portion proper. By direct operation of the planet wheel support members 10, 11 with the aid of the hand wheel 16 the inclination of the back rest may be set comparatively quickly whereas turning movement of the hand wheel 14 gives a high gearing ratio and consequently the setting of the back rest inclination occurs comparatively slowly, however while requiring correspondingly less effort. In accordance with this embodiment, the direction of the rotational setting movement is identical for both hand wheels.

It is also possible to eliminate one of the two hand wheels 14, 16 without departing from the inventive idea of the invention.

For instance, the gear rim 5 and its associated planet wheels 7 could have a cog tooth module of 1.6 and 33 and 12 teeth, respectively, whereas the gear rim 6 and the planet wheels 8 associated therewith suitably has a cog tooth module of 1.4 and a number of cog teeth amounting to 36 and 12, respectively. This ratio is suitable for the embodiment illustrated including three pairs of planet wheels, since 33 and 36, respectively, are multiples of 3. Obviously, it would be perfectly possible to use two as well as three or four pairs of planet wheels, provided the number of cog teeth on the gear rims are multiples of the number of wheel pairs. For instance, the gear rim 5 and the corresponding planet wheels 7 could in such a case be formed with a cog tooth module of 1.2 and with a number of teeth amounting to 48 and 18, respectively, whereas the gear rim 6 and the planet wheels 8 associated therewith could be formed with a cog tooth module of 1.0 and with a number of teeth amounting to 54 and 18, respectively. By a suitable choice of the number of teeth and cog tooth modules it is of course possible to choose other tooth number and module relationships for the planet wheel pairs. The above relationships are merely to be considered as examples of solutions that function well, but the invention should not be considered to be limited to the relationships mentioned above.

For the embodiment illustrated in FIGS. 3 and 4, which in several respects agrees with the one described in the aforegoing, corresponding parts have received the same numeral references as before with the addition of 100. For instance, the plate-like fitting component secured to the back rest is designated by 101, the corresponding fitting component secured to the seat part is designated by 103 and the attachment holes of the respective fitting components are designated by 102 and 104, respectively. In addition, the two planet wheels of the planet wheel pairs are designated by 107 and 10, respectively. The gear rims of the two fitting components are designated by 105 and 106, respectively, and the shafts of each planet wheel pair are designated by 109. Furthermore, the disc-shaped planet wheel support members are designated by 110 and 111, respectively. However, this embodiment is distinguished from the previous one e.g therein that the planet wheel support member 111 is formed with an external gear rim 121 in engagement with a pinion 122 associated with an electric motor 123 which by means of screws 124 or similar fastening means is secured on the fitting component 101. Obviously, the motor could be mounted in a corresponding manner on the other fitting component 103, should this be desired. In addition, the sun wheel has been eliminated in this embodiment but this function could, if desired, be served by the toothed wheel pinion 122, which in this case would be positioned centrally between the planet wheels. In this case, the outer gear rim track 121 could be eliminated. In addition, the planet wheels 107, 108 still are non-rotationally interconnected, and could for instance be manufactured as one integral piece but preferably so as to be rotational with respect to their shaft 109 which externally grips the planet wheel support members 110, 111 and thus efficiently maintains the relative position of these members without intermediate rivets, as in the previous embodiment.

When the motor 123 turns the planet wheel support member 111 via the pinion 122, the toothed wheels of the planet wheel pairs are driven in a rolling motion in mesh with their respective gear rims which on account of the different number of cog teeth move with respect to one another with resulting change of the angular relative positions of the components 101 and 103 and thus like in the previous embodiment setting of the back rest inclination.

Examples of suitable choices of cog tooth modules and numbers of teeth may be found in the description of the embodiment according to FIGS. 1 and 2 and one of the examples given for that embodiment is applicable also to the one illustrated in FIGS. 3 and 4 including four pairs of planet wheels. The device illustrated in the latter drawing figure obviously is applicable also with another number of planet wheel pairs.

In accordance with the embodiment illustrated in FIGS. 5–7 details corresponding to those used in the previous embodiments have received the same numeral reference with the addition of 200. For instance, the fitting component secured to the back rest is designated by 201, the fitting component secured to the seat part proper is designated by 203, the attachment holes of the respective fitting component are designated by 202 and 204, respectively. In addition, the gear rims of the respective fitting components are designated by 205 and 206, respectively. The toothed wheels mounted on the in this case single planet wheel pair is designated by 207 and 208, respectively. The planet wheel support members are designated by 210 and 211, respectively. A rivet 220, extending through the support members maintains the two planet wheel support members presses against one another and against the planet wheels. The planet wheel support members 210, 211 are sheet metal pressings and the support member 210 is formed with a centrally located upset flange 210a engaging the edges of a central hole formed in the support member 211. The support member 211 likewise has a centrally located, cylindrical portion 211a in which the planet wheel pair 207, 208 is seated. The two toothed wheels of the planet wheel pair are interconnected by means of rivets 230 extending between them. Engagement lugs 211b project axially from the support member 211 and wedge-shaped noses 231 formed on a cylindrical portion 232 on a hand wheel 216 may be inserted into said engagement lugs 211b when the hand wheel is pressed against the support disc 211. This causes the engagement lugs 211b to be prized apart as the noses 231 pass and then snap back into position behind the latter. In order to keep the planet wheel support members 210, 211 centered with respect to the gear rims 205, 206 these are peripherally fitted into slip guides 233 and 234 formed in fitting components 201 and 203, respectively.

When the hand wheel 216 is turned, the planet wheel support members 210, 211 perform a rotary motion relatively to the fitting components 201, 203. Because of the eccentricity of the detail 211a in relation to the guides 233, 234, the planet wheels 207, 208 will roll in mesh with the gear rims of the two fitting components, thus causing the two fitting components 201, 203 to perform a rotational movement relatively to one another. The use of one single planet wheel in this case makes it possible to obtain a very high gear ratio since one is no longer restricted by the necessity of providing for multiple division by the number of cog teeth. As an alternative, the number of cog teeth may be identical for both toothed wheels in a pair of planet wheels but their cog tooth modules differ from one another, whereby manufacture is considerably simplified, particularly as regards assembly while at the same time the strength is increased by the one-part manufacture. In the same manner, the planet wheels may be formed with the same number of cog teeth but with a different cog tooth module, also in the case of the previous embodiments.

Although the planet wheels may be formed with an identical number of cog teeth a suitable cog tooth module may be 1.4 for all cog teeth tracks, in which case the two cog rims may have 37 and 36 cog teeth, respectively, and the two planet wheels preferably have 29 and 28 teeth respectively.

In FIG. 8 parts that correspond to those used in the embodiments shown in the previous drawing figures are designated by the same numeral references with the addition of 300. For instance, the fitting component secured to the back rest has received numeral 301 and the fitting component secured to the seat part proper has received numeral 303. The attachment holes of the components are designated by 302 and 304, respectively. The gear rims of the fitting components are designated by 305 and 306, respectively and the associated toothed wheels of the planet wheel pairs are designated by 307 and 308, respectively. Like in the case of the previous embodiment in accordance with FIGS. 3 and 4, the planet wheel support members 310 and 311 are maintained associated with the planet wheel shafts 309, which in this case are riveted to the disk-shaped planet wheel support members which also form caps covering the gear tracks. The two planet wheels 307, 308 are kept together by means of an intermediary separation washer 335 which forms an efficient guide means for controlling the planet wheels and their respective gear rims in the fitting components. It may be appropriate to manufacture the planet wheel pairs in the form of one integral piece having a flange corresponding to the washer 335. Like in accordance with the embodiment illustrated in FIGS. 1 and 2, a centrally located sun wheel 313 is actuated by means of a hand wheel 314 which is connected to said wheel. Obviously, it is also possible to interconnect the planet wheel support member 311 with some kind of manually operating means or motor, if desired. Also, instead of the hand wheel 314 an actuating means in the form of a motor may be provided. FIG. 8 only shows two planet wheels but other numbers of wheels may, of course, also be used.

The invention is not limited to the embodiments described in the aforegoing merely as examples but could be varied in a number of different ways without departing from the fundamental inventive idea. In addition to the combinations of embodiments suggested above further combinations that present themselves readily to the expert are of course possible without departure from the inventive idea. Likewise, it is possible to arrange a similar articulated arrangement at both vehicle seat sides, preferably by means of a parallell coupling mechanism of some kind, for instance a common drive shaft extending between the vehicle sides. The invention is also applicable in other situations whenever two elements are to be set in mutual angular positions of inclination, such as is the case for instance in terminal table tops, work lamps, door-closing devices and the like.

I claim:

1. A device for relative angular setting of two units, preferably the inclination of a back rest of a seat, particularly a vehicle seat, comprising components that are interconnected in pairs for mutual rotational movement, said components preferably being separate fitting components which are arranged to be associated with the back rest and a seat face, respectively, of the vehicle seat, characterized in that each component of said pair of integrated components is formed with a gear rim, each with a different number of teeth, said rims being positioned adjacent one another in mutual concentric relationship with the rim teeth meshing with a number of planet wheel pairs, wherein each pair comprises two planet wheels, said wheels likewise being positioned adjacent one another in mutual concentric relationship and being non-rotationally interconnected, the planet wheels being supported by a common support member, and an actuator arranged to move the planet wheels along their respective gear rim, whereby the rolling of the planet wheel/wheels in mesh with the associated gear rim causes the two gear rims and the associated components of the joint to turn with respect to one another and consequently the back rest of the vehicle seat to pivot with respect to the seat face.

2. A device as claimed in claim 1, characterized in that the actuator is a hand wheel (16) which is non-rotationally connected to the planet-wheel support member.

3. A device as claimed in claim 2, characterized in that the planet wheels also mesh with a central sun wheel (12) which is drivingly connected to an actuator, the latter preferably being a hand wheel (14).

4. A device as claimed in claim 2, characterized in that the actuators (14, 16) associated with the planet wheel support members (10, 11) and with the sun wheel (12), respectively, may be made as two coaxial hand wheels, the wheel (14) connected with the sun wheel preferably being of smaller-diameter size with respect to, and located externally of, the hand wheel (16) connected with a planet wheel support member.

5. A device as claimed in claim 1, characterized in that the actuator is an electric motor (123) which by means of a drive gear (122) meshes with a gear rim (121) which is non-rotationally connected with the planet wheel support member (110, 111).

6. A device as claimed in claim 1, characterized in that each planet wheel is formed by a pair of separate toothed wheels having a common shaft and by a support and guide washer (335) positioned intermediate the toothed wheels and having a diameter exeeding that of the planet wheels (307, 308).

7. A device for relative angular setting of two units, preferably the inclination of a back rest of a seat, particularly a vehicle seat, comprising components that are interconnected in pairs for mutual rotational movement, said components preferably being separate fitting components which are arranged to be associated with the back rest and the seat face, respectively, of the vehicle seat, characterized in that each component of said pair of integrated components is formed with a gear rim, each with a different number of teeth, said rims being positioned adjacent one another in mutual concentric relationship with the rim teeth meshing with a number of planet wheel pairs, wherein each pair comprises two planet wheels, said wheels likewise being positioned adjacent one another in mutual concentric relationship and being non-rotationally interconnected, all planet wheels having the same number of teeth, the toothed wheels of the same pair having a different cog tooth module, the cog tooth module of the two gear rims corresponding to the cog tooth module of the planet wheel meshingly cooperating therewith while having a mutually different number of teeth, whereby the rolling of the planet wheel/wheels in mesh with the associated gear rim causes the two gear rims and the associated components of the joint to turn with respect to one another and consequently the back rest of the vehicle seat to pivot with respect to the seat face.

* * * * *